United States Patent [19]

Ruffner

[11] Patent Number: 4,616,074

[45] Date of Patent: Oct. 7, 1986

[54] ACRYLIC-METHYLENE SUCCINIC ESTER EMULSION COPOLYMERS FOR THICKENING AQUEOUS SYSTEMS

[75] Inventor: Charles G. Ruffner, Hamilton County, Tenn.

[73] Assignee: Alco Chemical Corporation, Chattannoga, Tenn.

[21] Appl. No.: 818,027

[22] Filed: Jan. 13, 1986

Related U.S. Application Data

[63] Continuation-in-part of Ser. No. 782,571, Oct. 1, 1985, which is a continuation-in-part of Ser. No. 719,768, Apr. 4, 1985, abandoned.

[51] Int. Cl.[4] ............................................. C08F 20/28
[52] U.S. Cl. .................................. 526/318; 524/549; 524/558; 526/270
[58] Field of Search ............................... 526/270, 318

[56] References Cited

U.S. PATENT DOCUMENTS

| | | | |
|---|---|---|---|
| 4,351,754 | 9/1982 | Dupre | 524/445 |
| 4,384,096 | 5/1983 | Sonnabend | 526/318 |
| 4,421,902 | 12/1983 | Chang et al. | 526/317 |

FOREIGN PATENT DOCUMENTS 0057875 1/1982 European Pat. Off. .
WO85/03510 1/1985 PCT Int'l Appl. .

*Primary Examiner*—Paul R. Michl
*Attorney, Agent, or Firm*—Howson and Howson

[57] ABSTRACT

Acrylic emulsion copolymers are prepared by emulsion polymerization of (A) a surfactant monomer, (B) an $\alpha,\beta$-ethylenically unsaturated carboxylic acid monomer, (C) a nonionic $\alpha,\beta$-ethylenically unsaturated monomer and (D) optionally a polyethylenically unsaturated cross-linking monomer. The surfactant monomer is prepared by condensing a mono or polyhydric alcohol nonionic surfactant with methylene succinic acid. At a low pH the copolymer may be in the form of an aqueous dispersion or latex, but thickens upon neutralization of at least some of the carboxyl groups.

20 Claims, No Drawings

ACRYLIC-METHYLENE SUCCINIC ESTER EMULSION COPOLYMERS FOR THICKENING AQUEOUS SYSTEMS

This application is a continuation-in-part of application Ser. No. 782,571 filed Oct. 1, 1985, which in turn is a continuation-inpart of application Ser. No. 719,768 filed Apr. 4, 1985, now abandoned.

BACKGROUND OF THE INVENTION

Alkali soluble and alkali swellable emulsion polymers and copolymers are well known (see e.g. Pat. Nos. 3,003,987; 3,070,561, and 3,081,198) and are useful in coatings, textile sizings, textile printing pastes, paints and industrial coatings where a water soluble resin can be utilized. They are also useful as thickening agents in latex based adhesives, where clays, other fillers, pigments and the like are present. In addition, alkali soluble emulsion polymers and copolymers find application in cleaners, laundry detergents, lotions and other personal care products. In petroleum exploration, acrylic polymers are used as drilling fluid additives for viscosity control and as bentonite extenders for enhancing performance of the drilling fluid. Thus, according to U.S. Pat. No. 4,301,016 water soluble alkali metal polyacrylates are useful additives in drilling fluids based on fresh water.

In drilling muds acrylics have performed well in fresh water drilling, U.S. Pat. No. 4,301,016, supra, and U.S. Pat. No. 2,718,497, but acrylics have poor salt tolerance as compared to some cellulosic materials. On the other hand acrylics and other synthetic polymers and copolymers offer a major advantage in manufacturing reproducability, as compared to chemically grafted or modified natural products, provided the salt tolerance problem is not a factor.

The resistance of acrylic polymers to biological decay is a property which is especially beneficial in drilling muds, paints, cleaner solutions, and personal care products. In order to provide improved properties for specific applications, functional polymeric side chains have been added to synthetic acrylic systems.

In various industrial applications, acrylics available as liquid emulsions and dispersions are generally easier to use than modified natural polymers which usually are dry powders, since the former are capable of addition at most any point in a mixing process. On the other hand, dry products based on starches, cellulose, and proteins require a relatively long hydration time and take longer to dissolve than the soluble alkali metal polymers.

U.S. Pat. No. 3,657,175 discloses improved thickening agents based on acrylics, styrene and butadiene, containing bound surfactant groups.

As shown by U.S. Pat. Nos. 4,384,096; 4,351,754, and 4,421,903, improved thickeners for aqueous systems have been developed in which there are introduced to the acrylic polymer backbones ester surfactant groups in sufficient number to enhance thickening and rheological properties. These thickeners find use in paints, coatings, adhesives, cleaners, drilling fluids, textile printing inks, personal care products, and the like.

SUMMARY OF THE INVENTION

According to this invention, new anionic copolymers are prepared by emulsion copolymerizing (A) an addition copolymerizable substituted methylene succinic acid ester surfactant monomer, (B) an $\alpha,\beta$-ethylenically unsaturated carboxylic acid monomer, (C) a nonionic $\alpha,\beta$-ethylenically unsaturated monomer, and (D) optionally a small amount of a polyethylenically unsaturated cross-linking monomer. The emulsion polymerization is carried out at a low pH and the resulting copolymers are essentially water insoluble and are present in the aqueous reaction medium in the form of a relatively stable dispersion. Upon addition of an alkaline material to the dispersion to neutralize the residual carboxyl groups on the copolymer, it becomes water soluble and substantially thickens the aqueous system in which it is present. The presence of the copolymerizable substituted methylene succinic ester surfactant monomer imparts to the copolymer the ability to provide higher water viscosities upon neturalization, as well as enhancing electrolyte stability. This latter property is most important to the stability of the rheological properties of thickened aqueous systems of very high alkalinity. The copolymerizable surfactant monomer can easily be prepared in near quantitative yield without unwanted side reactions or formation of by-products which would interfere with production of a commercial product of uniform composition and properties. The reaction employed in preparing the surfactant monomer is general for preparation of all such monomers, and allows the tailoring of copolymers for specific markets.

The new copolymer thickeners are obtained by emulsion polymerizing a monomer system comprising:

(A) about 1 to about 25 percent of at least one methylene succinic acid ester monomer of the formula:

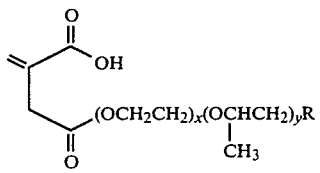

in which x is an integer from 1 to 150, and y is an integer from 0 to 50 when R is alkoxy, alkylphenoxy, dialkyl plenoxy, or alkyl carbonyloxy having 5 to 30 carbon atoms or a sorbitan fatty ester of the formula

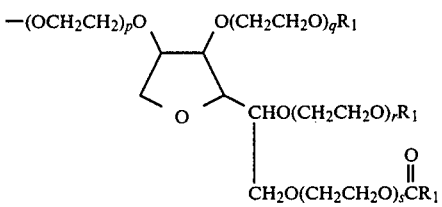

where each of p. q, r, and s is an integer and the sum of said integers is from 0 to 100, $R_1$ is H or $COR_2$ and $R_2$ is alkyl, alkyl phenyl, or dialkyl phenyl having 5 to 30 carbon atoms.

(B) about 5 to about 70 percent of a copolymerizable $\alpha,\beta$-ethyenically unsaturated carboxylic acid monomer of the formula:

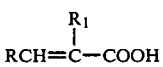

where R is H and $R_1$ is H, an alkyl group containing from 1 to 4 carbon atoms, or $-CH_2COOX$; R is —COOX and $R_1$ is H, and X is H or an alkyl group containing from 1 to 4 carbon atoms, (C) about 10 to about 90 percent of at least one nonionic, copolymerizable $\alpha$, $\beta$-ethylenically unsaturated monomer of the formula $$CH_2=CYZ$$

where Y is H and Z is CN, Cl, —COOR, —$C_6H_4R$,

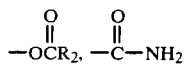

or —CH=$CH_2$; Y and Z are Cl, and Y is $CH_3$ and Z is CN,

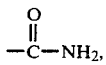

—CH=$CH_2$, —$C_6H_4R$, or —$COOR_1$, and R is H, Cl, Br or alkyl containing from 1 to 4 carbon atoms; $R_1$ is alkyl containing from 1 to 12 carbon atoms, or hydroxyalkyl containing from 2 to 8 carbon atoms, and $R_2$ is alkyl containing from 1 to 8 carbon atoms; and (D) up to 1 percent of a copolymerizable polyethylenically unsaturated cross-linking monomer, said percentages being by weight, based on the total weight of said monomers.

The copolymers are prepared by conventional emulsion polymerization methods at low pH, e.g. pH 2.5-5, yielding a high solids, low viscosity copolymer dispersion which thickens substantially upon neutralization of at least some of the remaining carboxyl groups. The copolymers are useful in a variety of applications, particularly as thickeners for aqueous systems. As liquid emulsion copolymers, they can readily be added at any point in the mixing process. Alternatively, the copolymers can be dried by any one of several well known methods, either as pure polymers, or onto a solid substrate such a kaolin clay.

DETAILED DESCRIPTION OF THE INVENTION

Monomeric Components

As noted previously the copolymers of this invention are prepared by emulsion copolymerization of three essential types of monomers, namely (A) a monomer surfactant obtained by condensing a nonionic surfactant with methylene succinic acid to yield an ethylenically unsaturated copolymerizable surfactant monomer, (B) an $\alpha$, $\beta$-ethylenically unsaturated carboxylic acid monomer, (C) a nonionic $\alpha$, $\beta$-ethylenically unsaturated monomer, and (D) optionally a polyethyenically unsaturated cross-linking monomer. The proportions of the monomers can be varied widely within certain specific ranges to obtain thickening agents possessing a variety of rheological properties. As prepared, the aqueous acidic copolymer dispersions are easily handled high solids latexes which upon neutralization of at least a portion of the carboxyl groups, swell and thicken aqueous systems. The nonionic monomer serves as a major constitutent of the copolymer backbone, and depending upon the amount thereof present permits modification of the film forming characteristics of the copolymers when dried. The bound surfactant monomer permits adjustment of the rheological properties provided by the copolymer, decreases the electrolyte sensitivity and enhances the thickening action of the copolymers.

(A) The substituted methylene succinic acid ester surfactant monomers.

As noted previously, the copolymers of this invention comprise about 1 to about 25 weight percent, based on total weight of monomers, of a substituted methylene succinic acid ester of the formula:

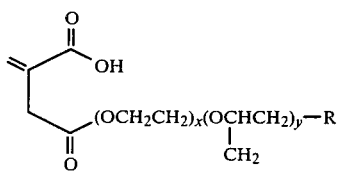

in which x is an integer from 1 to 150, and y is an integer from 0 to 50 when R is alkoxy, alkylphenoxy, dialklyl phenoxy, or alkyl carbonyloxy 5 to 30 carbon atoms or a sorbitan ester of the formula:

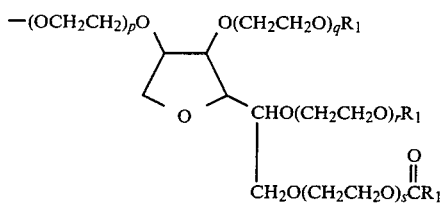

where each of p, q, r and s is an integer and the sum of said integers is from 0 to 50, $R_1$ is H or —$COR_2$, and $R_2$ is alkyl, alkylphenyl, or dialkylphenyl having 5 to 30 carbon atoms;

or x and y are each integers of from 0 to 40.

The copolymerizable nonionic surfactant monomers are prepared by a conventional acid catalyzed esterification reaction of an alcohol with methylene succinic acid. The water by-product of the reaction is removed via azeotropic distillation as it is formed to drive the reaction to completion.

Examples of nonionic surfactants which can be esterified with methylene succinic acid are the polyoxyethylene alcohols such as poly(oxyethylene)$_{20}$ stearyl ether and poly(oxyethylene)lauryl ether; ethoxylated alkyl phenols such as poly(oxyethylene)$_3$ nonylphenol and poly(oxyethylene)$_8$ dinonyl phenol; polyoxyethylene fatty acid esters such as poly (oxyethylene)$_8$ stearate and poly (oxyethylene)$_{40}$ stearate, sorbitan fatty acid esters, such as sorbitan monooleate and sorbitan monostearate, polyoxyethylene sorbitan fatty acid esters, such as poly(oxyethylene)$_{20}$ sorbitan monolaurate and poly(oxyethylene)$_{40}$ monostearate.

Preferably the surfactant monomer comprises from about 5 to 15 percent by weight of the copolymer, 7 to 10 percent being a particularly preferred quantity for such monomer.

(B) The copolymerizable $\alpha$, $\beta$-ethylenically unsaturated carboxylic acid monomer.

The copolymerizable $\alpha$, $\beta$-ethylenically unsaturated carboxylic acid monomers have the general formula

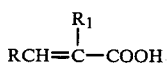

where R is H and $R_1$ is H, an alkyl group containing from 1 to 4 carbon atoms, or —$CH_2COOX$; R is —COOX and $R_1$ is H, and X is H or an alkyl group containing from 1 to 4 carbon atoms, Examples of these acid monomers include such monobasic acids as acrylic, methacrylic, crotonic, and acyloxypropionic acid. Dibasic acid monomers include maleic, fumaric, and itaconic acid, and they can be used in place of a portion, e.g. up to about 10 weight percent, of the monobasic acid. Monomers which are monoesters of dibasic acids, such as the monobutyl ester of maleic acid can also be used to advantage. The weight percent of carboxylic acid monomer is preferably between 5 and 70 percent, based on the total weight of monomers present. More preferably between 30 to 50 weight percent of the acid monomer is present. The most preferred weight percentage of the carboxylic acid monomer is between 35 and 45 percent. Acrylic and methacrylic acid are preferred acid monomers.

(C) Nonionic $\alpha$, $\beta$-ethylenically unsaturated monomers.

In the copolymers of this invention a monomer which serves as a major component of the backbone is a nonionic copoymerizable $\alpha$, $\beta$-ethylenically unsaturated monomer of the formula:

$$CH_2\!=\!CYZ$$

where Y is H and Z is CN, Cl, —COOR, —$C_6H_4R$, $$-OCR_2,\ \overset{O}{\underset{\|}{-}}\overset{}{C}-NH_2,$$

or —CH=$CH_2$; Y and Z are Cl, and Y is $CH_3$ and Z is CN, $$\overset{O}{\underset{\|}{-}}\overset{}{C}-NH_2,$$

—CH=$CH_2$, —$C_6H_4R$, or —$COOR_1$, and R is H, Cl, Br or alkyl containing from 1 to 4 carbon atoms; $R_1$ is alkyl containing from 1 to 12 carbon atoms, or hydroxyalkyl containing from 2 to 8 carbon atoms, and $R_2$ is alkyl containing from 1 to 8 carbon atoms.

Examples of these nonionic monomers are the $C_1$-$C_8$ alkyl and $C_2$-$C_8$ hydroxyalkyl esters of acrylic and methacrylic acids, such as methyl acrylate, ethyl acrylate, butyl acrylate, 2-ethyl hexyl acrylate, methyl methacrylate, ethyl methacrylate, butyl methacrylate, 2-hydroxybutyl acrylate, 2-hydroxyethyl methacrylate, 2-hydroxypropyl methacrylate, styrene, butadiene, isoprene, vinyl chloride, vinylidene chloride, acrylonitrile, methacrylonitrile, vinyl acetate, vinyl butyrate, vinyl caprolate, p-chloro styrene, isopropyl styrene, vinyl toluene and the like. The preferred monomers are acrylate and methacrylate esters alone or mixtures thereof with styrene, acrylonitrile, or vinyl acetate.

The nonionic monomer generally comprises from about 10 to about 90 percent by weight of the copolymer. The preferred proportion of this monomer is 30-70 weight percent, while the most preferred range is about 50-60 weight percent.

(D) The optional polyethylenically unsaturated cross-linking monomer.

A small amount of a polyethylenically unsaturated monomer may be added as a cross-linking agent. Such monomers include diallyl phthalate, vinyl crotonate, allyl methacrylate, divinyl benzene, $NN^1$-methylene-bis-acrylamide, ethylene glycol diacrylate, ethylene glycol dimethacrylate, 1,6-hexanediol diacrylate, and the like. Preferably from about 0.05 to 1 weight percent, based on total monomers, of the polyethylenically unsaturated monomer is incorporated into the copolymer.

The Copolymerization Reaction

The copolymers of this invention are readily prepared by conventional emulsion polymerization techniques using the monomers described above. The polymerization can be carried out in continuous, semi-continuous or batch fashion. The polymerization reaction can be initiated at 40°-90° C., preferably 75°-85° C., with the usual thermal decomposition initiators such as ammonium persulfate or potassium persulfate or at lower temperatures using redox initiators such as t-butyl hydroperoxide/bisulfite, or hydrogen peroxide with a ferrous compound. Alternatively azo initiators such as azobisisovaleronitrile can be used.

An anionic emulsifier is normally included in the reaction medium at a concentration of about 1 to 3 percent to maintain the copolymer product in the form of a stable aqueous dispersion. Suitable emulsifiers for such purpose are sodium lauryl sulfate, sodium dodecylbenzene sulfonate, as well as other ammonium, and alkali metal alkyl aryl sulfonates, ammonium and alkali metal alkyl sulfates, sodium dioctyl sulfosuccinate, and sulfonated alkyl esters and amides. Optionally, a nonionic surfactant, such as nonylphenol ethoxylates, octylphenol ethoxylates and linear or branched alkyl ethoxylates also may be employed if desired as they have a marked effect on the properties of the copolymer product.

The polymerization is carried out at a pH below about 5.0, generally in the range of 2.5 to 5, to maintain the insolubility of the copolymer in the continuous water phase by reason of the presence of free carboxyl groups. The finished copolymer dispersions have a relatively low viscosity even at a solids content of from 20-40 weight percent, or higher. Upon addition of an alkali to neutralize at least a portion of the free carboxyl groups, aqueous systems containing the copolymers markedly thicken.

The Properties of the Copolymers

The improved copolymers of this invention are in-situ thickeners prepared by emulsion copolymerization at a pH between 2.5 and 5. The polymerization product is a milky white latex-like aqueous dispersion having a solids content up to about 50 percent, generally from 20-40 percent, by weight. The viscosity of these dispersions is generally low, typically from 25-100 cps at 25° C. The dispersions, which are relatively stable, are easily blended into a variety of aqueous systems. Different dispersions according to the invention can be blended together to provide the properties desired for a specific application. The pure copolymer, in dried form, is a solid at a temperature of 25° C.

Upon addition of an alkaline material such as an alkali metal hydroxide, sodium carbonate, or other bases such as ammonium hydroxide, methylamine or diethylamine, at least some of the free carboxy groups in the polymer are neutralized, rendering the copolymer soluble in water. At a low pH, e.g. a pH below about 5.5, the polymer exists in the form of discrete, water insoluble particles, having an average particle size of about 0.1 to 5 microns. Average molecular weights of the copolymers are estimated to be between about 100,000 and 5,000,000. Preferred copolymers have an average molecular weight of from about 500,000 to 1,000,000. Copolymers having substantially higher molecular weights may be obtained when a polyethylenically unsaturated cross-linking monomer is also present.

The selection of the nonionic $\alpha, \beta$-ethylenically unsaturated monomer has a significant effect on the thickening potential of the copolymers. Other properties such as the rheology of thickened compositions are dependent on the pH of neutralization, and the glass transition temperature, which properties may also be modified by the choice of non-ionic monomer. For example, butyl acrylate can be incorporated into the copolymer backbone to lower the glass transition temperature, or "soften" the copolymer. On the other hand, incorporation of methacrylate esters into the copolymer will stiffen the copolymer backbone and thereby harden a cast film of the polymer.

The following examples, in which all parts are by weight unless otherwise indicated, are presented as a means of further describing the preparation and use of the novel copolymers of this invention, and should not be considered as limiting the scope of the invention.

EXAMPLE 1

Preparation of the surfactant monomer heptadecyl poly(oxyethylene)$_{19}$ ethyl methylene succinate.

A mixture of 198.9 g (0.175 mole) of heptadecyl poly(oxyethylene)$_{19}$ ethanol, 150 g toluene, 0.5 g of methyl ether of hydroquinane (MEHQ) was charged to a 500 ml reaction flask equipped with a thermometer, mechanical stirrer, heating mantel and Dean and Stark separator. The mixture was heated to reflux to remove any residual water in the surfactant. The mixture was cooled to 70° C. when 22.8 g of methylene succinic acid (0.175 mole) were added and allowed to stir until dissolved. Then 1.0 g of para toluene sulfonic acid (TSA) was added and the mixutre was again heated to reflux. After 4 hours, 95% of the theoretical amount of water had been removed and the toluene was removed in vacuo. The product cooled to a white wax that was used without purification. This reaction is general for ethoxylated fatty alcohols.

EXAMPLE 2

Preparation of dinonyl phenoxy poly (oxyethylene)$_8$ ethyl methylene succinate.

A mixture of 200 g (0.27 mole) of previously dried dinonyl phenoxy poly(oxyethylene)$_8$ ethanol, 0.5 MEHQ, and 150 g toluene were charged to a reactor equipped as in Example 1. The mixture was heated to 60° C. and 35 g of methylene succinic acid were added and allowed to dissolve, then 1.0 g of TSA was added. The mixture was heated to reflux for 3 hours at which time the reaction was deemed complete based on water removal. The toluene was removed in vacuo and the resulting oil was used without purification. This reaction is general for ethoxylated alkyl and dialkyl phenols.

EXAMPLE 3

Preparation of sorbitan monstearate poly (oxyethylene)$_{19}$ ethyl methylene succinate.

A mixture of 200 g of previously dried poly (oxyethylene)$_{20}$ sorbitan monostearate (0.153 mole), 0.5 g MEHQ and 150 g of toluene were added to a reactor equipped as in Example 1. The mixture was heated to 70° C. when 15.9 g (0.122 mole) of methylene succinic acid and 1.0 g TSA were added. The reaction was completed as described in Example 2. The product was used without further purification after toluene removal. This reaction is general for the class of sorbitan esters.

TABLE I

| CPS* | | Procedure Used Example No. |
|---|---|---|
| 1 | Hexadecyloxy poly(oxyethylene)$_3$ ethanol | 1 |
| 2 | Heptadecyloxy poly(oxyethylene)$_{19}$ ethanol | 1 |
| 3 | Dinonylphenoxy poly(oxyethylene)$_8$ ethanol | 2 |
| 4 | Dinonylphenoxy poly(oxyethylene)$_{39}$ ethanol | 2 |
| 5 | Poly(oxyethylene)$_{20}$ sorbitan monosterate | 3 |

*copolymerizable surfactant

EXAMPLE 4

Preparation of a copolymer comprising heptadecyloxy poly(oxyethylene)$_{19}$ ethyl methylene succinate, methacrylic acid and ethyl acrylate.

An aqueous monomer mixture was prepared by combining 6.14 grams of a 30% solution of sodium lauryl sulfate, 23 grams of the monomer of Example 1, and 264 grams of water. After the monomer of Example 1 was well dispersed, 90.5 grams of methacrylic acid, 116.0 grams ethyl acrylate, and 0.23 grams diallyl phthalate were added and the mixture was vigorously agitated to provide a uniform white emulsion. To an all glass reaction vessel equipped with a mechanical stirrer, heating mantle, thermometer, condenser, and dropping funnel were added 219 grams of water and 6.14 grams of a 30% solution of sodium lauryl sulfate. The reactor contents were heated with agitation to 85° C. and 9.9 grams of a 2.5% ammonium persulfate solution were added. Addition of the monomer pre-emulsion mixture was begun at the rate of 2.5 ml./min. After 10 minutes the monomer feed rate was increased to 8 ml./min. and 2.5 ml. shots of 0.35% ammonium persulfate were added at 5 minute intervals. After completion of the monomer addition, 19.8 grams of 0.45% ammonium persulfate solution were added and the copolymer was cooked out for 1.5 hours. The resulting emulsion copolymer was cooled and filtered through a 40 mesh screen to remove any grit. The filtrate had a 30% solids content and the pH thereof was 2.9. A 1.0% solids solution thereof raised to pH 9.0 with NaOH, provided a viscosity of 19,000 cps at 25° C. (#6 spindle at 10 RPM Brookfield LVT).

Using the above-described emulsion polymerization procedure, seven different copolymer dispersions of the invention were prepared and these are identified by "LEC" (liquid emulsion copolymer) numbers in Table II, below. Also presented in this table are viscosities for aqueous systems containing the copolymers.

TABLE II

LIQUID EMULSION COPOLYMERS (LEC)
Brookfield Viscosity (CPS at 25° C.)

| LEC | Monomer Weight % (1) | CPS NO. (2) | Copolymer Concentrations | | | 3% Copolymer Concentration 2% Sodium Chloride (3) |
|---|---|---|---|---|---|---|
| | | | 1% (3) | 2% (4) | 3% | |
| 1 | 40/50/10 | 1 | 8,500 | 94,000 | 268,000 (4) | 74,000 (4) |
| 2 | 40/50/10 | 2 | 19,000 | 156,000 (4) | 328,000 (4) | 112,000 (4) |
| 3 | 42/53/5 | 2 | 9,500 | 55,500 | 160,000 (4) | 160,000 (4) |
| 4 | 40/55/5 | 3 | 7,500 | 49,000 | 140,000 (4) | 136,000 (4) |
| 5 | 40/50/10 | 3 | 8,500 | 72,000 | 208,000 (4) | 136,000 (4) |
| 6 | 40/50/10 | 4 | 14,500 | 82,000 | 192,000 (4) | 128,000 (4) |
| 7 | 40/50/10 | 5 | 8,000 | 72,000 | 200,000 (4) | 10,000 |

(1) In all examples proportions are for ethylacrylate/methylmethacrylate/CPS. All copolymers contain 0.1% diallylphthalate.
(2) See Table I.
(3) Spindle #6 @ 10 RPM Brookfield RVT.
(4) Spindle #7 @ 10 RPM Brookfield RVT.

DESCRIPTION OF USES OF THE COPOLYMERS

As noted previously the copolymers of this invention are prepared by conventional emulsion polymerization methods and the resulting copolymer dispersions which contain 5 to 50 percent, generally 20 to 40 percent of copolymer, are suitable as is for use in various industrial applications such as adhesives, coatings, drilling fluids, cleaners, walljoint compounds, lotions and other personal care products, highly absorbant applications, paints, wall paper adhesives, textile print pastes, textile sizings, oil recovery applications, and the like.

Freeze point depressants may be added to the latex products of this invention to provide moderate cold weather protection during shipping if desired. The list of suitable freeze point depressants is long and the members thereof are well known to trade. Among the generally suitable freeze point depressants are lower molecular weight alcohols and glycols such as methanol, ethanol, isopropanol, butanol, ethylene glycol, propylene glycol, butylene glycol, diethylene glycol, ethylene glycol monoethylether, ethylene glycol dimethyl ether, and the like.

Alternatively, the product of the invention can be dried by a variety of known industrially available methods. These include, but are not limited to, tray drying, spray drying, drum drying, freeze drying, and precipitation and recovery followed by tray or fluidized bed drying. Additionally, the copolymer products of this invention can be dried onto a variety of particulate substrates such as silica, kaolin, lignite, bentonite and other clays, and weighting materials normally utilized in various applications. The purpose of using such substrates is to enable delivery of dry products capable of rapid mixing and dispersion in various applications where the support material is compatable with the desired composition. In addition, the presence of a solid particulate support facilitiates the drying of copolymers that form films at relatively low temperatures, frequently a limiting factor in drying process selection. The use of dried blends of this type eliminates all concern of product freeze damage and related costs to provide cold weather protection during shipping. In addition, copolymer products of various properties can be delivered to the end user in dry form with acceptable economics.

The copolymer dispersions of the invention usually can be combined in aqueous compositions designed for partular applications with predictable effects due to the fact that the surfactant monomer may be carefully chosen and incorporated in the copolymer chain in the desired amount.

Print Pastes

The copolymer dispersions of the invention are of interest as print paste thickeners for use in, but not limited to, textile printing. For example, aqueous dispersions having a concentration of 1 percent polymer solids of several of the foregoing examples were studied in "clear" formulations resulting from neutralization with ammonium hydroxide to pH 9. The "clear" formulations were then typically treated with up to 10% of an acrylic "low crock" print binder, a representative composition of such type being offered for sale by Alco Chemical Corporation under the designation PB-1, a 45% solids acrylic emulsion polymer (CAS No. 27082-10-6) and 5% of a color concentrate of the type sold by many companies to textile mills. A typical product of the general type is offered for sale by Catawba Charlabs of North Carolina as Impriment Blue SGG, a blue paste for test purposes.

Viscosity determinations were made on the "clear" formulations and print pastes and the results are set forth in Table III, below. The "LEC" numbers which appear in this and subsequent tables are for copolymers of the same number identified in Table II above.

TABLE III

| | Brookfield Viscosity (cps @ 25° C.) 10 RPM | |
|---|---|---|
| LEC | Clear Dispersion 1% Solids | Print Paste |
| 2 | 19,000 | 24,000 |
| 3 | 8,200 | 7,300 |
| 6 | 12,900 | 15,000 |

Any number of different color concentrates may be substituted for the blue concentrate used in these examples. Colors are selected to answer the need of stylists in the printing industry. The degree of crosslinking of the copolymer thickeners can be varied for the purpose of altering print paste rheology. The viscosities set forth in Table III can be varied by addition of a nonionic surfactant to the print paste.

Adhesive Applications

General purpose adhesives may be thickened with copolymer dispersions of this invention to the high viscosity required for rendering the adhesives useful for various purposes such as floor tile and carpet installation. For example, there is commercially available for such purposes an adhesive having the necessary filler loading and containing a solvent-based tackifying resin, to which a styrene butadiene latex is added. A small amount of the dispersion was added to the adhesive and Brookfield viscosities were determined on the adhesive before and after addition of the latex. The results obtained are set forth in Table IV, below:

TABLE IV

| | | Brookfield Viscosity @ 5 RPM (cps @ 25° C.)* | |
|---|---|---|---|
| LEC | Wet Parts Used** | Adhesive Base | After Latex Addition |
| 2 | 0.67 | 68,000 | 50,000 |

*Determined with a Heliopath TC viscometer.
**30% solids, see TABLE II

Oil Well Drilling Fluids

Typical oil well drilling fluids were prepared using standard methods, and the fluids were subjected to the API Fluid Loss Test and Fann 35 Viscosimeter test. A comparison was made of the thickening effects of various thickeners of this invention utilizing a standard bentonite composition (Aquagel ® of N. L. Baroid, Inc.) dispersed in mud at 14 pounds per barrel (PPB). In some of the tests fresh water mud was used. In addition, muds contaminated with either sodium chloride at a concentration of 7 500 mg/l (PPM) free chloride or 500 mg./l (PPM) of free calcium ion in the filtrate were also , tested for thickening effect. The muds were tested for apparent viscosity at 600 RPM (A.V.), plastic viscosity in cps. (P.V.), yield point (Y.P.), lbs/100 ft.$^2$, gel stength. The results are set forth in Tables V, VI and VII, below:

TABLE V

| | | 500 ppm Calcium Ion System | | | | | | | | | |
|---|---|---|---|---|---|---|---|---|---|---|---|
| | | Apparent Viscosity (cps)* | | | | | | 10 sec./ | | Gel | |
| LEC | ppb | 3 | 6 | 100 | 200 | 300 | 600 | 10 min. | P.V. | Y.P. | A.V. |
| 2 | 0.07 | 10 | 10 | 15 | 17 | 19 | 23 | 11/12 | 4 | 15 | 11.5 |
| | 0.10 | 12 | 12 | 17 | 20 | 22 | 26 | 13/13 | 4 | 18 | 13.0 |
| | 0.15 | 14 | 14 | 20 | 23 | 26 | 31 | 13/13 | 5 | 21 | 15.5 |
| | 0.20 | 16 | 16 | 24 | 27 | 30 | 36 | 15/15 | 6 | 24 | 18.0 |
| Base + CaCl$_2$ | — | 5 | 5 | 8 | 9 | 11 | 14 | 7/9 | 3 | 8 | 7.0 |
| Base | — | 1 | 1 | 3 | 5 | 7 | 13 | 1/4 | 6 | 1 | 6.5 |

*Fann 35 Viscometer, reading divided by two.

TABLE VI

| | | 7,500 ppm Chloride Ion System | | | | | | | | | |
|---|---|---|---|---|---|---|---|---|---|---|---|
| | | Apparent Viscosity (cps)* | | | | | | 10 sec./ | | Gel | |
| LEC | ppb | 3 | 6 | 100 | 200 | 300 | 600 | 10 min. | P.V. | Y.P. | A.V. |
| 2 | 0.07 | 11 | 11 | 16 | 20 | 23 | 31 | 14/24 | 8 | 15 | 15.5 |
| | 0.10 | 10 | 11 | 16 | 20 | 24 | 32 | 14/22 | 8 | 16 | 16.0 |
| | 0.15 | 11 | 11 | 18 | 23 | 27 | 37 | 14/22 | 10 | 17 | 18.5 |
| | 0.20 | 12 | 12 | 20 | 25 | 30 | 41 | 15/19 | 11 | 19 | 20.5 |
| Base + NaCl | — | 11 | 11 | 15 | 18 | 20 | 26 | 14/25 | 6 | 14 | 13.0 |
| Base | — | 1 | 1 | 3 | 5 | 7 | 12 | 1/1 | 5 | 2 | 6.0 |

*Fann 35 Viscometer, reading divided by two.

Walljoint Compound

A walljoint compound was prepared in which were included various copolymer dispersions of the invention.

This compound, designed for use in gypsum board tape joints for building construction, had the formulation set forth in Table VII.

TABLE VII

Walljoint Compound

| Part A | |
|---|---|
| Component | % by Weight |
| Water | 37.8 |
| Dispersant | .63 |
| LEC thickener of the invention | (See Table II) |
| Clay | 1.25 |
| Ethylene glycol | .63 |
| Defoamer | .63 |
| Latex | 5.6 |

| Part B | |
|---|---|
| Component | Weight Percent |
| Titanium dioxide | 31.1 |
| Mica (325 mesh) | 11.0 |
| Filler | 11.0 |

Procedure

The components of Part A were blended together to provide a smooth mixture using a low shear folding type mixer. The components of Part B were dry blended and added slowly to Part A, and mixing was continued until a smooth blend was obtained. Part of the water of Part A was withheld and added during the addition of Part B.

The resulting walljoint compounds of this invention were tested for certain physical properties and the results are tabulated in Table VIII, below:

TABLE VIII

Brookfield Viscosity (cps @ 25° C.)

| LEC* | 2.5 RPM Spindle TE, Heliopath Viscometer | Non Leveling | Slip | Adhesion |
|---|---|---|---|---|
| 3 | 520,000 | good | good | good |
| Blank | 140,000 | poor | poor | poor |

*See Table II

Paper Coatings

Paper coatings prepared using copolymers of this invention offer an improvement over coatings containing prior thickeners, especially as regards efficiency, i.e. the amount of thickneer required to increase the viscosity of the coatings to useful levels. In this regard, the overall rheology of coatings of both the low and high shear type containing thickeners of this invention were studied. The fluid retention of the coatings was compared using an "S. D. Warren" tester, and electronic water retention (EWR) in seconds was measured. The EWR values have a bearing on the overal usefulness of a particular thickener, regardless of the amount used in the coating, and provides evidence of runability of the coating. The results of the tests are presented in Tables IX and X.

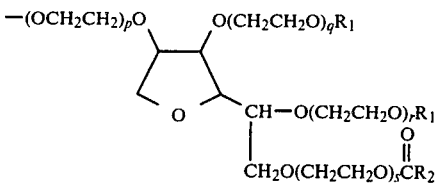

where each of p, q, r and s is an integer and the sum of said integers is from 0 to 100, $R_1$ is H or $-COR_2$ and $R_2$ is alkyl, alkylphenyl, or dialkylphenyl having 5 to 30 carbon atoms;

TABLE IX

Paper Coating Formulation*

Viscosity, 3000 cps @ 25° C.

| LEC** | Thickener Parts by Weight (Dry) | Brookfield Viscosity-20 RPM (cps @ 25° C.) | Fluid Retention EWR, Sec. 30#/ream | Fluid Retention EWR, Sec. #5 Whatman | Kaltec*** High Shear Viscosity, cm. | Weight Percent Dry Polymer on 100 Parts Coating Clay |
|---|---|---|---|---|---|---|
| 3 | 0.2 | 830 | 29 | 35 | 3.3 | 0.40 |
|   | 0.4 | 3300 |   |   |   |   |
|   | 0.6 | 8900 |   |   |   |   |
|   | 0.8 | — |   |   |   |   |
| Control | (no thickener) | 100 | 6 | 22 | NR | — |

*Dow 620 butadiene-styrene latex 15.0 dry parts, number one coating clay 100 parts solids, 50% coating solids, pH 9.0 by addition of ammonium hydroxide.
**See Table II
***"E" Bob, 4400 rpm; 200,000 spring set.

TABLE X

Paper Coating Formulation*

Viscosity, 3000 (cps @ 25° C.

| LEC** | Thickener Parts by Weight (Dry) | Brookfield Viscosity-20 RPM cps @ 25° C.) | Fluid Retention EWR, Sec. 30#/ream | Fluid Retention EWR, Sec. #5 Whatman | Kaltec** High Shear Viscosity, cm. | Weight Percent Dry Polymer on 100 parts Coating Clay |
|---|---|---|---|---|---|---|
| 3 | 0.2 | 250 | 25 | 65 | 7.8 | 0.55 |
|   | 0.4 | 1200 |   |   |   |   |
|   | 0.6 | 4000 |   |   |   |   |
|   | 0.8 | — |   |   |   |   |
| Control | (no thickener) | 100 | 6 | 25 | NR | — |

*National Starch Co. polyvinyl acetate latex 1105 15.0 dry parts, number one coating clay 100 solids parts, 50% solids coating, pH 9.0 by addition of ammonium hydroxide.
**See Table II
***"E" Bob, 4400 rpm; 200,000 spring set.

I claim:

1. A copolymer obtained by aqueous emulsion copolymerization of a monomer system comprising
(A) about 1 to about 25 percent of at least one substituted monomer of the formula:

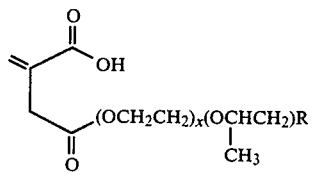

in which x is an integer from 1 to 150, and y is an integer from 0 to 50, where R is alkoxy, alkylphenoxy, dialkylphenoxy, or alkyl carbonyloxy having 5 to 30 carbon atoms, or a sorbitan fatty ester of the formula (B) about 5 to about 70 percent of a copolymerizable α, β-ethylenically unsaturated carboxylic acid monomer of the formula $$RCH{=}\overset{R_1}{\underset{|}{C}}-COOH$$

where R is H and $R_1$ is H, an alkyl group containing from 1 to 4 carbon atoms, or $-CH_2COOX$; R is $-COOX$ and $R_1$ is H, and X is H or an alkyl group containing from 1 to 4 carbon atoms, (C) about 10 to about 90 percent of at least one nonionic, copolymerizable α, β-ethylenically unsaturated monomer of the formula $$CH_2{=}CYZ$$

where Y is H and Z is CN, Cl, $-COOR$, $-C_6H_4R$,

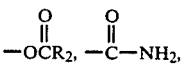

or

—CH=CH$_2$; Y and Z are Cl, and Y is CH$_3$ and Z is CN,

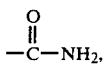

—CH=CH$_2$, —C$_6$H$_4$R, or —COOR$_1$, and R is H, Cl, Br or alkyl containing from 1 to 4 carbon atoms; R$_1$ is alkyl containing from 1 to 12 carbon atoms, or hydroxyalkyl containing from 2 to 8 carbon atoms, and R$_2$ is alkyl containing from 1 to 8 carbon atoms; and (D) up to 1 percent of a copolymerizable polyethylenically unsaturated cross-linking monomer, said percentages being by weight, based on the total weight of said monomers.

2. An emulsion copolymer according to claim 1 polymerized from a monomer system comprising (A) about 5 to about 15 percent of said substituted methylene succinic ester monomer, (B) about 30 to about 50 percent of said $\alpha$, $\beta$-ethylenically unsaturated monomer in which R is H, and R$_1$ is H or an alkyl group containing from 1 to 4 carbon atoms, and (C) about 30 to about 70 percent of said $\alpha$, $\beta$-ethylenically unsaturated monomer in which Y is H and Z is —COOR where R is alkyl containing from 1 to 4 carbon atoms.

3. An emulsion copolymer according to claim 2 in which in said substituted methylene succinic acid ester monomer (A), R is a sorbitan monoester in which R$_1$ is an alkyl group containing from 10 to 20 carbon atoms and the sum of p, q, r and s is 10 to 20, Z is CH$_2$=CH— or CH$_2$=C(CH$_3$)—, A is alkylene containing from 2 to 4 carbon atoms, and x and y are zero.

4. An emulsion coploymer according to claim 3 in which in said substituted methylene succinic acid ester monomer (A), R is sorbitan trioleate, and the sum of p, q, r and s is zero.

5. An emulsion copolymer according to claim 1 polymerized from a monomer system comprising (A) about 7 to about 10 percent of said substituted methylene succinic acid ester monomer, (B) about 35 to about 45 percent of acrylic or methacrylic acid, (C) about 50 to about 60 percent of ethyl acrylate, and (D) about 0.5 to about 1 percent of said polyethylenically unsaturated cross-linking monomer.

6. An emulsion copolymer according to claim 5 polymerized from a monomer system comprising:

(A) a substituted methylene succinic acid ester of a compound selected from the group consisting of hexadecyloxypoly(oxyethylene)$_3$ ethanol, heptadecyloxypoly(oxyethylene)$_{19}$ ethanol, dinonylphenoxy poly(oxyethylene)$_8$ ethanol, dinonylphenoxy poly(oxyethylene)$_{39}$ ethanol, poly(oxyethylene)$_{20}$ sorbitan monosterate, (B) methacrylic acid, (C) ethyl acrylate, and (D) diallylphthalate.

7. An aqueous colloidal dispersion comprising from about 5 to about 50 percent, by weight, of an emulsion copolymer of claim 1 having a pH of from about 2.5 to about 5.

8. An aqueous colloidal dispersion comprising from about 5 to about 50 percent, by weight, of an emulsion copolymer of claim 6 having a pH of from about 2.5 to about 5.

9. A process for making the aqueous colloidal dispersion of claim 7 comprising emulsion polymerizing the monomeric system thereof at a pH of from about 2.5 to about 5 in the presence of a free radical producing initiator at a temperature of from about 40° to about 90° C.

10. A process for making the aqueous colloidal dispersion of claim 8 comprising emulsion polymerizing the monomeric system thereof at a pH of from about 2.5 to about 5 in the presence of a free radical producing initiator at a temperature of from about 75° to about 85° C.

11. A thickened aqueous composition containing an effective thickening amount of at least a partially neutralized emulsion copolymer of claim 1.

12. A process for making a thickened aqueous composition which comprises combining with the aqueous composition an effective thickening amount of an emulsion copolymer of claim 1 and at least partially neutralizing said copolymer to thus thicken said composition.

13. A thickened composition according to claim 11 comprising a latex paint.

14. A thickened composition according to claim 11 comprising a pigment dispersion.

15. A thickened composition according to claim 11 comprising an oil well drilling fluid.

16. A thickened composition according to claim 11 comprising a textile printing paste.

17. A thickened composition according to claim 11 comprising an adhesive.

18. A thickened composition according to claim 11 comprising a liquid detergent.

19. A thickened composition according to claim 11 comprising a paper coating composition.

20. A thickened composition according to claim 11 comprising a wall joint compound.

* * * * *

UNITED STATES PATENT AND TRADEMARK OFFICE
CERTIFICATE OF CORRECTION

PATENT NO. : 4,616,074
DATED : October 7, 1986
INVENTOR(S) : Charles G. Ruffner

It is certified that error appears in the above—identified patent and that said Letters Patent are hereby corrected as shown below:

Column 2, line 52, in the formula "$\overset{\overset{O}{\|}}{C}R_1$"

should read --$\overset{\overset{O}{\|}}{C}R_2$--.

Column 4, line 30, in the formula "$\overset{\overset{O}{\|}}{C}R_1$"

should read --$\overset{\overset{O}{\|}}{C}R_2$--.

Signed and Sealed this

Twenty-fourth Day of March, 1987

*Attest:*

DONALD J. QUIGG

*Attesting Officer*    *Commissioner of Patents and Trademarks*